May 30, 1961 R. SCHRECONGOST 2,986,702
SWEEP CIRCUIT
Filed Jan. 3, 1955
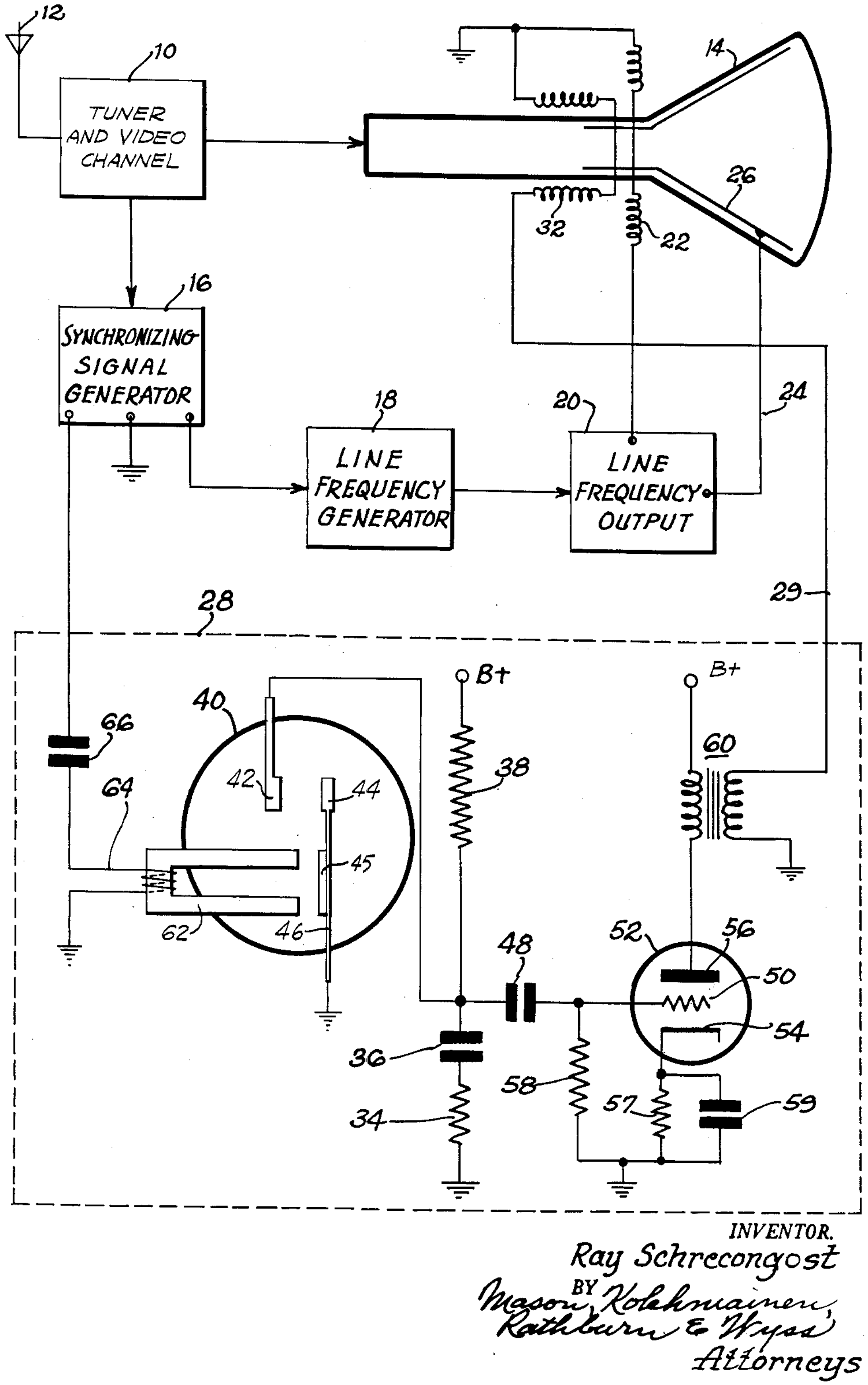
INVENTOR.
Ray Schrecongost
BY Mason, Kolehmainen, Rathburn & Wyss
Attorneys 2,986,702

SWEEP CIRCUIT

Ray Schrecongost, Chicago, Ill., assignor, by mesne assignments, to Sylvania Electric Products Inc., Wilmington, Del., a corporation of Delaware Filed Jan. 3, 1955, Ser. No. 479,364

3 Claims. (Cl. 328—65)

The present invention relates to a scanning circuit, more particularly to a cathode ray tube scanning circuit for use in a television receiver and has for a principal object the provision of a simple and yet reliable scanning voltage generator circuit which is controlled in accordance with received synchronizing pulses.

The vertical scanning oscillator of a conventional television receiver ordinarily supplies currents of sawtooth wave form to the vertical deflection winding of a scanning yoke positioned about the neck of a cathode ray tube type image reproducing device to effect vertical deflection of the electron beam of the tube. Whereas present day vertical scanning oscillators are synchronized with the received vertical synchronizing pulses, for economic reasons television receivers of the type used in the home do not include an automatic frequency control circuit and, consequently, are somewhat responsive to noise disturbances in the received wave which under certain conditions destroy the vertical interlace and produce undesired distortion of the reproduced image and may in some instances cause a complete loss of vertical synchronization.

Another object of the present invention is, therefore, to provide a new and improved vertical frequency scanning generator which has good noise rejection characteristics and which can be manufactured at a sufficiently low cost to permit its use in television receivers designed for sale in a competitive market.

Still another object of the present invention is to provide a new and improved cathode ray sweep circuit having good noise rejection characteristics and which produces a scanning wave of voltage in synchronism with a received wave of synchronizing pulses.

Briefly, in accordance with the present invention there is provided in a television receiver of the type adapted to receive a wave of synchronizing pulses for control of a signal of scanning wave form, a free running oscillator circuit in which is employed a gas filled diode tube having one fixed and one movable electrode, the latter being mounted on a reed which has a natural frequency of vibration substantially equal to the vertical sweep frequency. An electromagnetic system, which is responsive to received synchronizing pulses, is positioned so as to influence the vibrations of the reed and maintain the oscillator in synchronism with the received synchronizing pulses, thereby to synchronize the scanning wave of voltage which is supplied to the vertical deflection winding. Due to the mechanical resonance of the tuned reed, a high degree of noise immunity, approaching that of a conventional AFC circuit, is obtained without requiring the additional circuitry necessary for a conventional AFC circuit.

The invention, both as to its organization and method of operation, together with further objects and advantages thereof, will best be understood by reference to the following specification taken in connection with the accompanying drawings, in which the single figure of the drawing is a schematic, somewhat diagrammatic, illustration of a television receiver embodying a preferred form of the present invention.

Referring now more particularly to the figure, the television receiver there shown includes a unit 10 having an input circuit coupled to a conventional high frequency antenna 12 and an output circuit coupled to the input electrode of a cathode ray tube type image reproducer 14. The unit 10 is conventional and includes a tuner and I.F. amplifier, a video detector, and a video amplifier. The picture signal developed in the output circuit of the video detector of the unit 10 is applied to a synchronizing signal separator 16 where the synchronizing signal components of the picture signal are separated from each other and from the video components thereof, the horizontal synchronizing components being supplied to control the synchronized operation of a horizontal or line frequency generator 18. The output of the generator 18 is coupled through a line frequency output amplifier 20 for application to the horizontal deflection winding 22 of a scanning yoke positioned in the conventional manner about the neck of the image reproducing discharge device 14. The line frequency output stage 20 also provides a direct current high voltage output which is supplied along a conductor 24 to the high voltage anode 26 of the image reproducing device 14. The vertical synchronizing pulses, separated from the television signal by the unit 16, are applied to a vertical or field frequency generator 28, the detailed arrangement and operation of which will be described hereinafter, and the output of the generator 28 is applied to a vertical deflection coil 32 of the scanning yoke.

With the exception of the field frequency scanning generator 28, the construction and operation of the television receiver thus far described is conventional in that a television signal received by the antenna 12 is applied to the unit 10, amplified, detected, and again amplified after detection before being used to control the intensity of the cathode ray beam of the image reproducing device 14. The vertical and horizontal synchronizing components of the received signal are separated by the separator 16 and are applied to the respective vertical and horizontal scanning systems 28 and 20 to control the synchronized operations thereof. The scanning signal supplied from the output circuit of the unit 20 to the horizontal deflection winding 22, and the scanning signal supplied from the vertical scanning unit 28 to the vertical deflection winding 32 cause the cathode ray beam of the device 14 to trace a raster of horizontal lines to reproduce the televised image.

Referring now more particularly to the portion of the receiver embodying the present invention, the unit 28 includes a sweep wave from producing circuit comprising a condenser 36 which is charged from the positive B+ supply through the resistor 38 and is discharged by a gaseous discharge device 40 which is connected across the condenser 36 and is provided with a stationary anode 42 and a movable cathode 44. A peaking resistor 34 is included in series with the condenser 36 to provide the pulse component of the sweep wave form. The cathode 44 of the tube 40 is mounted on a flexible element 46 so that the spacing between the electrodes 44 and 46 can be varied.

The circuit elements thus far described are so chosen that the oscillator including the discharge device 40 and the charging circuit of the capacitor 36 has a natural oscillation frequency which is just slightly lower than the desired vertical scanning rate. The sweep voltage output signal from the diode oscillator circuit appears at the anode 42 of the tube 40 and is coupled through a condenser 48 to the control electrode 50 of a vertical sweep frequency output amplifier 52 having a cathode 54 and an anode 56. A grid leak resistor 58 is interconnected between the control electrode 50 and ground and an operating bias voltage is provided at the cathode 54 by means of a cathode resistor 57 and bypass capacitor 59 interconnected between the cathode 54 and ground. The amplified vertical sweep signal from the device 52 is coupled through a conventional coupling transformer 60 to the conductor 29 for application to the vertical deflection coils 32.

In accordance with the present invention, the vibratory element 46 comprises a tuned reed, which, with the cathode 44 forms a vibrating system having a natural resonant frequency or period which is slightly lower than the vertical scanning rate. A magnetic circuit arrangement including an electromagnetic structure 62 and associated coil 64 wound thereon is provided to exert, during the synchronizing pulse intervals, a pulling force on a magnetic member 45 which is attached to the reed 46 intermediate the cathode 44 and the envelope of the tube 40. The reed 46 is thus caused to vibrate in synchronism with the received synchronizing pulses which are coupled through the capacitor 66 to the coil 64. Whereas a double pole magnetic structure 62, 64 is shown, it will be understood that a polarized arrangement utilizing a member 45, which is pre-magnetized may be used to simplify the construction of the diode 40.

Considering now the operation of the combined scanning generator and AFC circuit 28, when the receiver is first energized, the capacitor 36 is charged from the B+ source through the charging resistors 34 and 38 at the natural charging rate of the charging circuit to effect an increasing voltage at the anode 42. When the voltage difference between the anode 42 and the cathode 44 reaches the ionizing potential of the tube 40, the tube 40 becomes conductive to effectively short circuit the electrodes 42 and 44. The capacitor 36 then discharges through the resistor 34 and the tube 40 until the voltage difference between the anode 42 and the cathode 44 becomes insufficient to support conduction. The device 40 then becomes non-conductive, and the charging cycle repeats itself. The resistor 34 provides the conventional pulse component of the deflection wave form so that the voltage which is supplied to the vertical deflection winding 32 has the desired shape to produce vertical deflection of the cathode ray across the face of the picture tube 14.

In order to synchronize the deflection wave form developed by the oscillator 40 with the received synchronizing pulses, the vibratory electrode 44 is arranged to control the instant during each scanning cycle at which the tube 40 is fired and discharge of the condenser is initiated. Preferably, the free running frequency of the oscillator is somewhat lower than the desired vertical scanning frequency so that the vertical synchronizing pulses will occur just slightly before the tube 40 ionizes due to the increasing voltage developed across the condenser 36. Accordingly, when a synchronizing pulse flows through the coil 64 a pull is exerted on the magnetic member 45 attached to the reed 46 so that the cathode 44 is moved closer to the anode 42 by an amount sufficient to cause the tube 40 to fire.

The electromagnetic circuit 62, 64 thus produces a pulsating magnetic field in response to the vertical synchronizing pulses supplied to the coil 64, thereby to cause the reed 46 to vibrate in synchronism with the received vertical synchronizing pulses so as to synchronize the vertical sweep therewith.

In addition to controlling the phase and frequency of the scanning signal applied to the control electrode 50 of the vertical sweep output amplifier 52, the mechanical inertia of the vibrating system including the reed 46 acts as a flywheel so as to provide a synchronizing circuit having a high Q which is responsive to the synchronizing pulses which are periodically received at substantially the natural frequency of the reed, but which is substantially non-responsive to spurious noise impulses appearing in the received synchronizing wave. Accordingly, a noise immunity is achieved comparable to that of a conventional AFC circuit without requiring a complex circuit arrangement.

For purposes of illustration and not by way of limitation, the invention has been described in connection with the vertical sweep generator of a monochromatic television receiver. Whereas it perhaps finds its greatest application in such an embodiment, the invention may also be employed in the horizontal sweep generator of a monochromatic television receiver or in any of the sweep generators of a color television receiver which are synchronized by received synchronizing pulses.

While there has been described what is at present considered to be the preferred embodiment of the invention, it will be understood that various modifications may be made therein which are within the true spirit and scope of the invention as defined in the appended claims.

What is claimed as new and is desired to be secured by Letters Patent of the United States is:

1. In a television receiver of the type adapted to receive a wave of synchronizing pulses for control of a signal of scanning wave form, the combination of a synchronizing signal generator, a source of direct voltage, a charging circuit including a capacitor connected between said source and a point of fixed potential, a gaseous discharge device, having at least two electrodes, connected to discharge said capacitor during periods of conduction between said electrodes, and means independent of said signal generator and responsive to the output of said generator for altering the spacing between the active surfaces of said electrodes at the desired scanning frequency, said synchronizing signal generator being in a circuit uninfluenced by the charge and discharge of said capacitor.

2. In a television receiver of the type adapted to receive a wave of synchronizing pulses for control of a signal of scanning wave form, the combination of a synchronizing signal generator, a source of direct voltage, a charging circuit including a capacitor connected between said source and a point of fixed potential, a gaseous discharge device having at least two electrodes, one of said electrodes being mounted on a vibratory member, the vibratory system having a natural resonant frequency substantially equal to the desired scanning frequency, magnetic means independent of said signal generator and responsive to the output of said generator for controlling the vibration of said vibratory system, and means utilizing said discharge device for charging and discharging said capacitor at the desired scanning rate to effect a scanning signal, said synchronizing signal generator being in a circuit uninfluenced by the charge and discharge of said capacitor.

3. A combined vertical sweep frequency oscillator and automatic frequency control circuit comprising a charging circuit including a capacitor and at least first and second resistors serially connected between a first source of fixed potential and a second source of fixed potential, said sources having substantially different potentials, a gas filled diode discharge device connected across said capacitor and said first resistor, said diode and said charging circuit forming a self-running oscillator having a natural frequency of oscillation substantially equal to the desired scanning frequency, means for deriving a signal of scanning wave form from across said capacitor and said first resistor, said diode including a hermetically sealed envelope and a pair of electrodes enclosed therein, means having a substantially high mechanical inertia for varying the spacing between said electrodes in a sinusoidal manner at substantially the desired scanning rate, and electromagnetic means positioned in close proximity to at least one of said electrodes, said last named means being responsive to received synchronizing pulses to synchronize the variation in the spacing between said electrodes with said synchronizing pulses, whereby a signal of scanning wave form in synchronism with the received signal of synchronizing pulses is produced.

References Cited in the file of this patent

UNITED STATES PATENTS

| | | |
|---|---|---|
| 1,780,698 | Blackman | Nov. 4, 1930 |
| 1,860,285 | Gunn | May 24, 1932 |
| 2,121,607 | McIlvaine | June 21, 1938 |
| 2,525,544 | Hall | Oct. 10, 1950 |